United States Patent
Ryabova et al.

(10) Patent No.: US 7,964,818 B2
(45) Date of Patent: Jun. 21, 2011

(54) METHOD AND APPARATUS FOR PHOTOMASK ETCHING

(75) Inventors: Elmira Ryabova, Mountain View, CA (US); Richard Lewington, Hayward, CA (US); Madhavi R. Chandrachood, Sunnyvale, CA (US); Amitabh Sabharwal, San Jose, CA (US); Darin Bivens, San Mateo, CA (US)

(73) Assignee: Applied Materials, Inc., Santa Clara, CA (US)

( * ) Notice: Subject to any disclaimer, the term of this patent is extended or adjusted under 35 U.S.C. 154(b) by 1121 days.

(21) Appl. No.: 11/554,482

(22) Filed: Oct. 30, 2006

(65) Prior Publication Data
US 2008/0101978 A1    May 1, 2008

(51) Int. Cl.
*B23K 10/00* (2006.01)

(52) U.S. Cl. .......... 219/121.59; 219/121.44; 219/121.41

(58) Field of Classification Search ............. 219/121.41, 219/121.43, 121.44, 121.59, 121.48
See application file for complete search history.

(56) References Cited

U.S. PATENT DOCUMENTS

| | | | |
|---|---|---|---|
| 4,732,622 A | | 3/1988 | Jones |
| 4,755,492 A | | 7/1988 | Greskovich et al. |
| 5,096,880 A | * | 3/1992 | Rybka .......................... 505/400 |
| 5,188,676 A | | 2/1993 | Taylor |
| 5,578,145 A | | 11/1996 | Adamson et al. |
| 6,853,141 B2 | | 2/2005 | Hoffman et al. |
| 6,949,486 B2 | | 9/2005 | Sasaki et al. |
| 2004/0159984 A1 | | 8/2004 | Isomura et al. |
| 2006/0000802 A1 | | 1/2006 | Kumar et al. |
| 2006/0043067 A1 | | 3/2006 | Kadkhodayan et al. |
| 2006/0243358 A1 | | 11/2006 | Colburn et al. |
| 2008/0207432 A1 | | 8/2008 | Hamada |

FOREIGN PATENT DOCUMENTS

| | | |
|---|---|---|
| EP | 0 263 662 | 4/1988 |
| JP | 63123813 A | 5/1988 |
| JP | 2002 068838 | 3/2002 |
| JP | 2002 255647 | 9/2002 |
| JP | 2004 269350 | 9/2004 |
| JP | 2004269350 A | 9/2004 |
| JP | 2004 292270 | 10/2004 |
| JP | 2005 170728 | 6/2005 |
| JP | 2005 335991 | 12/2005 |
| JP | 2006 021990 | 1/2006 |
| KR | 20060054358 A | 5/2006 |
| KR | 10-2006-0054358 | 5/2008 |
| WO | WO-2005009919 A1 | 2/2005 |

OTHER PUBLICATIONS

Šajgalik, "Importance of Chemistry in High-Tech Ceramics Design", *Pure Appl. Chem.*, vol. 74, No. 11, pp. 2137-2144, 2002.
Notice of Final Rejection for Korean Patent Application No. 10-2007-0108776 dated Apr. 27, 2009.
Extended European Search Report dated Feb. 21, 2008 for Application No. 07018393.4.
Notice to File a Response for Korean Patent Application No. 10-2007-0108776 dated Jul. 28, 2009.
Office Action dated Oct. 21, 2008 for Korean Patent Application No. 10-2007-0108776.

* cited by examiner

*Primary Examiner* — Mark H Paschall
(74) *Attorney, Agent, or Firm* — Patterson & Sheridan, LLP

(57) ABSTRACT

A method of fabricating yttria parts is provided herein. In one embodiment, the method includes sintering a yttria sample, machining the sintered sample to form a part, and annealing the part in a three-stage process that includes heating the part at a predetermined heating rate, maintaining the part at a constant annealing temperature, and cooling the part at a predetermined cooling rate.

11 Claims, 5 Drawing Sheets

METHOD AND APPARATUS FOR PHOTOMASK ETCHING

BACKGROUND OF THE INVENTION

1. Field of the Invention

Embodiments of the present invention generally relate to a method and apparatus for etching photomasks and, more specifically, to a method and apparatus for etching photomasks with improved component parts.

2. Description of the Related Art

The fabrication of microelectronics or integrated circuit devices typically involves a complicated process sequence requiring hundreds of individual steps performed on semi-conductive, dielectric and conductive substrates. Examples of these process steps include oxidation, diffusion, ion implantation, thin film deposition, cleaning, etching and lithography. Using lithography and etching (often referred to as pattern transfer steps), a desired pattern is first transferred to a photosensitive material layer, e.g., a photoresist, and then to the underlying material layer during subsequent etching. In the lithographic step, a blanket photoresist layer is exposed to a radiation source through a reticle or photomask containing a pattern so that an image of the pattern is formed in the photoresist. By developing the photoresist in a suitable chemical solution, portions of the photoresist are removed, thus resulting in a patterned photoresist layer. With this photoresist pattern acting as a mask, the underlying material layer is exposed to a reactive environment, e.g., using wet or dry etching, which results in the pattern being transferred to the underlying material layer. The terms "mask", "photomask" or "reticle" will be used interchangeably to denote generally a substrate containing a pattern.

The pattern on a photomask, which is typically formed in a metal-containing layer supported on a glass or quartz substrate, is also generated by etching through a photoresist pattern. In this case, however, the photoresist pattern is created by a direct write technique, e.g., with an electron beam or other suitable radiation beam, as opposed to exposing the photoresist through a reticle. With the patterned photoresist as a mask, the pattern can be transferred to the underlying metal-containing layer using plasma etching.

Existing process kits or component parts of a plasma chamber are often made of alumina (aluminum and aluminum oxide). Halogen-containing gases, e.g., fluorine- or chlorine-containing gases, are used in etching the various material layers in the fabrication of photomasks. It is believed that alumina is vulnerable to attack by fluorine species, resulting in the formation of $Al_xF_yO_z$ on the surface of component parts. Such etch by-product may come off as particles during processing, resulting in contamination and defects on the mask substrate. Furthermore, some alumina parts seem to be susceptible to breakage, probably as a result of mechanical stress created during machining. Thus, there is a need for alternative ceramic materials suitable for use as component parts for plasma applications, and for improved processes for fabricating such materials.

SUMMARY OF THE INVENTION

The invention provides a method of fabricating a yttria part, in which a sintered yttria sample is machined to form the part, and the part is annealed after machining.

Another embodiment of the invention provides a part comprising at least about 99.5 percent yttria for use in a plasma reactor.

Yet another embodiment of the invention provides a plasma process chamber comprising a part made of at least about 99.5 percent yttria, a support pedestal disposed in the process chamber and adapted to receive a substrate thereon, and a power source for forming a plasma within the chamber.

The invention also provides a method of etching a photomask, comprising providing a process chamber having a pedestal and at least one part comprising at least about 99.5 percent yttria, placing the photomask on the pedestal, introducing at least one process gas into the process chamber, forming a plasma from the at least one process gas and etching the photomask.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

It is to be noted, however, that the appended drawings illustrate only exemplary embodiments of this invention and are therefore not to be considered limiting of its scope, for the invention may admit to other equally effective embodiments.

DETAILED DESCRIPTION

Figure 1:
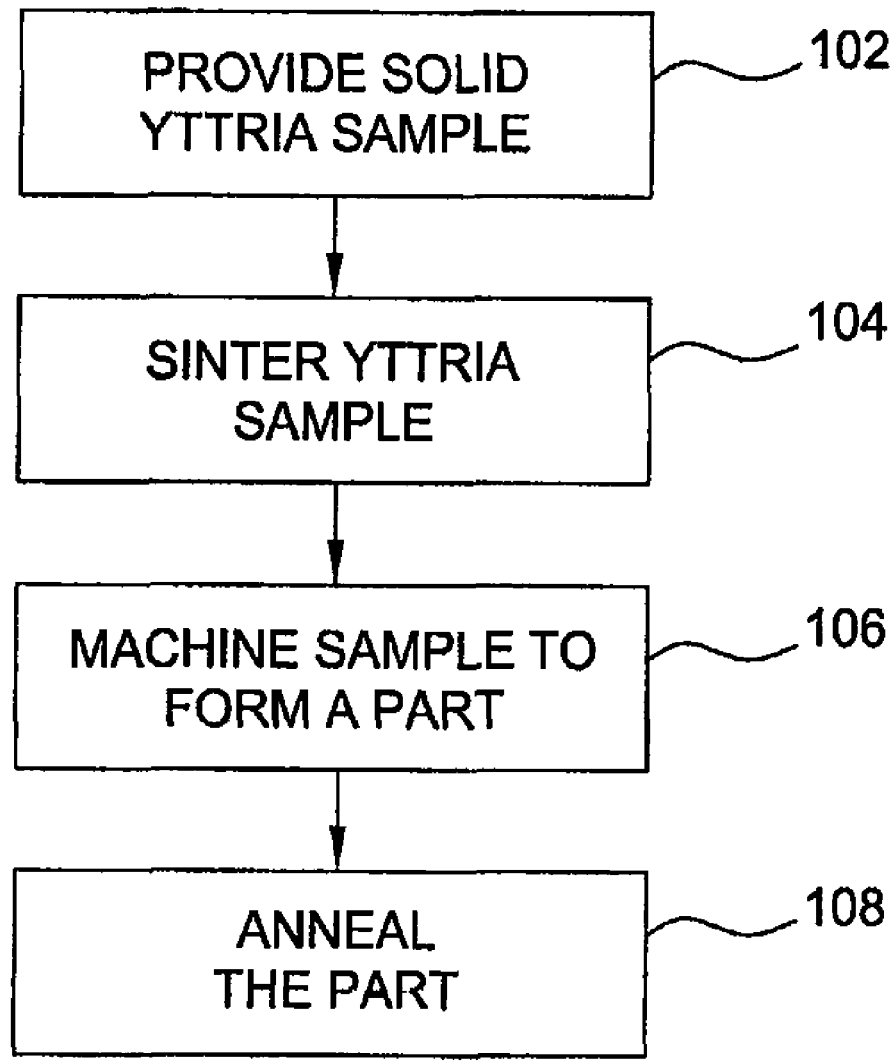
FIG. 1 is a schematic illustration of a method for fabricating bulk yttria parts according to the present invention.

The present invention provides a method for fabricating parts made of bulk or solid yttria with improved characteristics such as reduced stress and enhanced chemical resistance. Specifically, it is found that such improved characteristics are obtained if a part is subjected to a high temperature anneal after it is machined. FIG. 1 illustrates the steps in a method 100 that can be used to fabricate these improved yttria parts. A solid yttria sample is provided at the beginning of the process in step 102. The solid yttria sample may be made by a variety of techniques known to one skilled in the art. For example, yttria (yttrium oxide, $Y_2O_3$) in powder form may be used as the starting material, and a slurry is formed by adding other components such as water, binder, and suitable additives that may be used to facilitate the fabrication process or to enhance the properties of the parts. After drying, the slurry is press-molded into a block to form the solid yttria sample. In step 104, the solid yttria sample is sintered by exposing it to a high temperature environment, which causes the yttria particles to fuse together. After sintering, the yttria sample is machined into a part, as shown in step 106. In general, the part may be any component part of different equipment or machines, and may be have a variety of shapes or dimensions. In one embodiment, the machined part is a component of a plasma processing chamber, with a purity level higher than about 99.9 percent. In other embodiments, samples with a purity level higher than about 99.5 percent yttria are also suitable for use in plasma processing chambers. In step 108, the machined part is subjected to an annealing step at an elevated temperature under controlled conditions. After annealing, the part may undergo further processing, as needed, to prepare it for use or installation.

According to one embodiment of the present invention, the annealing step 108 comprises three stages. During the first stage, the part is exposed to an annealing gas and subjected to a ramp-up heating from a first temperature, e.g., ambient temperature, to a second, predetermined, temperature. In the second stage, the part is maintained at the second temperature (the annealing temperature) for a time period that is sufficient to substantially relieve any stress that might have been created or induced by the previous machining operation, and to provide the desired chemical resistance. In the third stage, the part is subjected to a ramp-down cooling back to the first temperature.

In one embodiment, the annealing step 108 is performed in an oven with air at atmospheric pressure. Using air as the annealing gas offers the advantages of both convenience and relatively low cost. For the yttria parts of interest, which has a purity level of at least about 99.5 percent yttria, annealing in air is sufficient to provide the desired properties in the finished parts, and there is no particular need for gas mixtures with more active components such as a reducing or oxidizing atmosphere. Other inert or non-reactive atmospheres may also be used for annealing the yttria parts, e.g., nitrogen, argon, among others, or mixtures thereof; or other relatively inert mixtures with oxygen concentrations different from that of air. Depending on the specific applications, certain parts may benefit from the use of forming gas (e.g., a mixture of 4 percent or less than 10 percent by volume of hydrogen in nitrogen), or gas mixtures containing different concentrations of hydrogen, or reducing or oxidizing gases. For example, if surface modification is needed, e.g., chemical modification or passivation, then annealing may be done in a reducing or oxidizing environment, as appropriate.

In one embodiment, the annealing is done under at static environment. In general, however, a gas flow environment is also acceptable. The static condition offers the advantage of reduced cost, while the gas flow configuration is beneficial for annealing involving chemical reactions with the sample so that a fresh supply of the annealing gas can be maintained. For parts with certain geometric shapes or features such as grooves, it may also be advantageous to use turbulent flow as opposed to laminar flow conditions.

The ramp-up heating and ramp-down cooling rates during the first and third stages of the annealing step are controlled to be sufficiently slow in order to minimize stress that might arise from non-uniform thermal expansion or contraction, while high enough to provide a practical throughput for the process. Thus, each of the ramp-up heating and ramp-down cooling stages may take place over a time period from about 8 hours to about 48 hours, with the specific time being dependent on the specific parts. For example, the size, shape, surface area to volume ratio, and thermal properties of the parts such as coefficient of thermal expansion or thermal capacity, are factors to consider in determining the appropriate heating or cooling rates.

In embodiment, a steady or constant heating rate is used, and is controlled such that an external temperature gradient does not exceed about 1 Kelvin per centimeter (K/cm) near the surface of the part. In this context, the external temperature gradient refers to the temperature gradient close to the surface of the part, e.g., in a region close to the interface between the part and the annealing gas. In another embodiment, the heating rate is controlled such that an internal temperature or thermal gradient within the part does not exceed about 10 Joules per kilogram per Kelvin (J/kg-K). In yet another embodiment, the heating rate is controlled to maintain both the external and internal thermal gradients to be below the respective limits throughout the first time period.

The annealing temperature used in the second stage depends on the specific yttria part, and may also depend on the additives used in the parts. In general, the annealing temperature should be at least about 200 Kelvin lower than the eutectic point for the material composition. For the yttria parts of interest, a range of about 200 degrees Celsius to about 1000 degrees Celsius can be used, while in one embodiment, the annealing temperature is between about 800 degrees Celsius to about 1000 degrees Celsius. The time period for the second stage depends on the specific part, e.g., dimension, shape or compositions. Parts that are relatively large, or those with shapes that may be prone to mechanical stress, will generally require a longer annealing period. For some embodiments, the annealing period may span over several days, e.g., from 4 to about 7 days.

In the ramp-down cooling stage, the part is cooled at a controlled rate according to similar criteria in order to minimize thermal stress that might otherwise arise at excessively high cooling rates. In one embodiment, the part is cooled at a steady or constant rate that is approximately the same as that used during ramp-up heating.

It is found that the bulk yttria part fabricated using this method exhibits improved properties including, for example, reduced stress and enhanced chemical resistance. A comparative study has been performed to demonstrate the improved properties of a bulk yttria sample after it has been processed through annealing according to one embodiment of the invention. In particular, surface roughness, brightness and X-ray diffraction results from three batches of yttria coupons or samples are compared. The three samples were processed through different fabrication steps: 1) as-sintered; 2) machined; and 3) machined and annealed. The samples were then exposed to fluorine- and oxygen-containing plasmas for about 12 hours. Surface roughness measurements show that Sample #3 has a surface roughness that is lower than that of the as-sintered sample (Sample #1), but about the same as that of Sample #2.

X-ray diffraction results show that the as-sintered sample #1 contains two different phases with microcrystallite structures. After machining, the surface of the sample became single-phase, which is more desirable than a dual-phase sample. The machined and annealed sample remains single-phase, but the stress level is reduced compared to sample #2.

Finally, the erosion resistance after plasma exposure was also compared, and sample #3 was found to have minimal erosion, followed by the as-sintered sample #1, while the machined-only sample #2 exhibits the most erosion.

These results suggest that the machined and annealed part (sample #3) is best suited for use in a plasma environment because of the reduced stress. The smoother finish also reduces particle generation arising from materials deposited during processing.

Although the method can generally be used to fabricate a variety of yttria parts of different dimensions or shapes, it is particularly beneficial for certain machined parts that are more prone to mechanical stress, e.g., parts with openings or angular portions or shapes, or parts for use in a reactive environment, e.g., plasma reactor.

Figure 2:
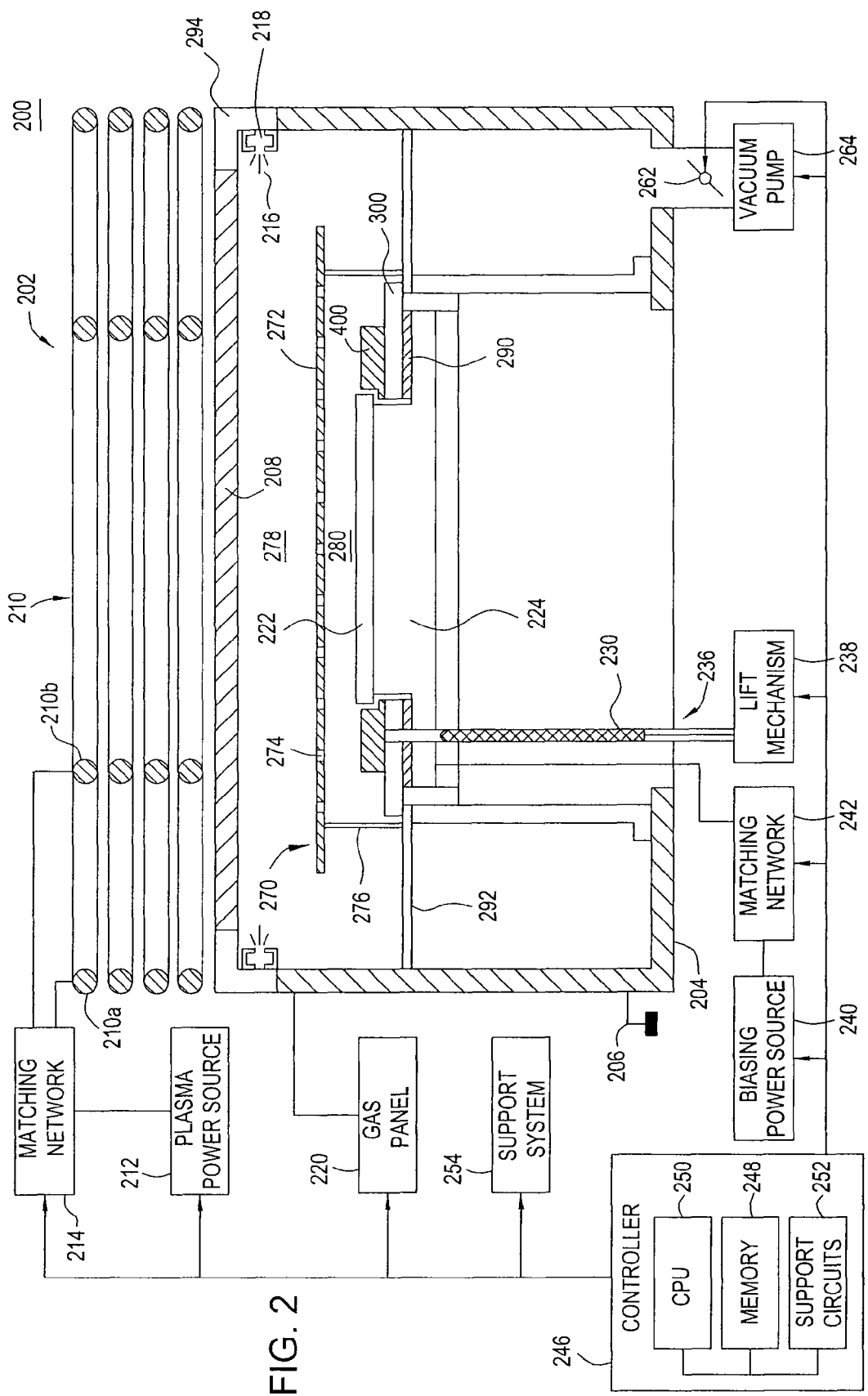
FIG. 2 is a schematic diagram of a plasma etch reactor having at least one bulk yttria part made according to a method of the invention.

FIG. 2 depicts a schematic diagram of an etch reactor 200 with certain component parts made of bulk yttria. Suitable reactors that may be adapted for use with the teachings disclosed herein include, for example, the Decoupled Plasma Source (DPS®) II reactor, or the Tetra I and Tetra II Photomask etch systems, all of which are available from Applied Materials, Inc. of Santa Clara, Calif. Details of another embodiment of an etch reactor have been disclosed in U.S. patent application Ser. No. 10/882,084, entitled "Method and Apparatus for Photomask Plasma Etching", which is herein incorporated by reference in its entirety. The embodiment of the reactor 200 shown herein is provided for illustrative purposes and should not be used to limit the scope of the invention, and it is contemplated that other plasma reactors, including those from other manufacturers, may be adapted to benefit from the invention.

The reactor 200 generally comprises a process chamber 202 having a substrate pedestal 224 within a conductive body (wall) 204, and a controller 246. The chamber 202 has a substantially flat ceiling or chamber lid 208. Other modifications of the chamber 202 may have other types of ceilings, e.g., a dome-shaped ceiling. An antenna 210, disposed above the lid 208, comprises one or more inductive coil elements that may be selectively controlled (two co-axial elements 210a and 210b are shown in FIG. 2) through a first matching network 214 coupled to a plasma power source 212. The plasma power source 212 is typically capable of producing up to about 3000 W at a tunable frequency in a range from about 50 kHz to about 13.56 MHz.

The substrate pedestal (cathode) 224 is coupled through a second matching network 242 to a biasing power source 240. The biasing source 240 generally is a source of up to about 500 W at a frequency of approximately 13.56 MHz that is capable of producing either continuous or pulsed power. Alternatively, the source 240 may be a DC or pulsed DC source.

In one embodiment, the substrate support pedestal 224 has a central protruding portion having a shape and dimensions that substantially match those of a typical substrate, e.g., a square shaped substrate. A cover ring 300 and a capture ring 400, both made of bulk yttria by the process 100 described above, are disposed above the substrate support pedestal 224. An annular insulator 290 is provided between an outer portion of the substrate support pedestal 224 and the cover ring 300.

Figure 3A:
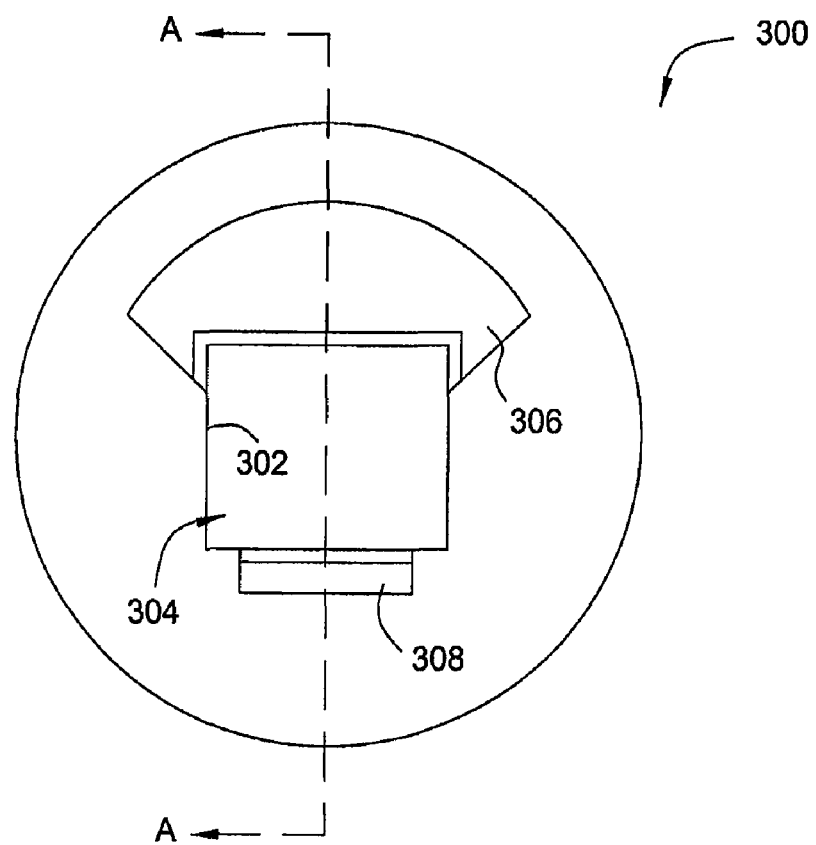
FIG. 3A-B are a schematic illustrations of the top and cross-sectional views of a cover ring.
Figure 3B:
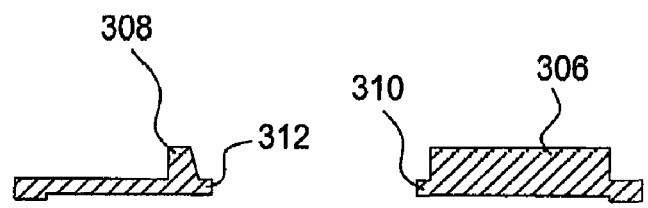

FIGS. 3A-B are schematic illustrations of the top and cross-sectional views of the cover ring 300. The cover ring 300 has an inner perimeter 302 defining a center opening 304 that is shaped and sized to substantially match the substrate 222, and two top protruding portions 306 and 308 disposed adjacent to the opening 304. As shown in FIG. 3A, the protruding portion 306 is in the shape of a segment of an annular ring with a truncated inner portion that substantially matches a portion of the inner perimeter 302. The other protruding portion 308 is substantially rectangular in shape. Lip portions 310 and 312 are provided adjacent to the protruding portions 306 and 308, respectively.

Figure 4A:
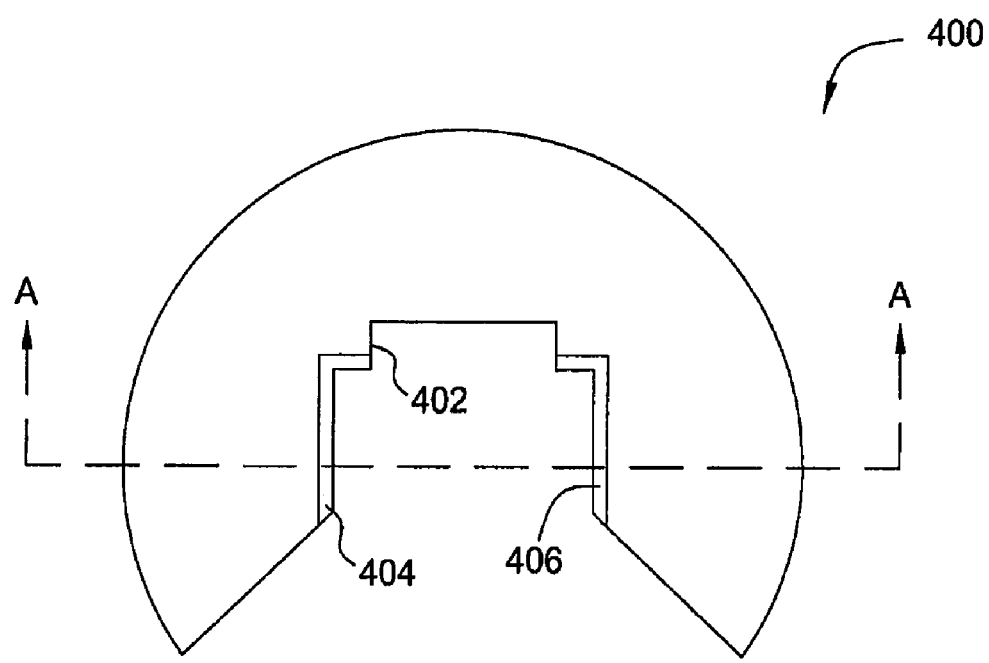
FIG. 4A-B are schematic illustrations of the top and cross-sectional views of a capture ring.
Figure 4B:
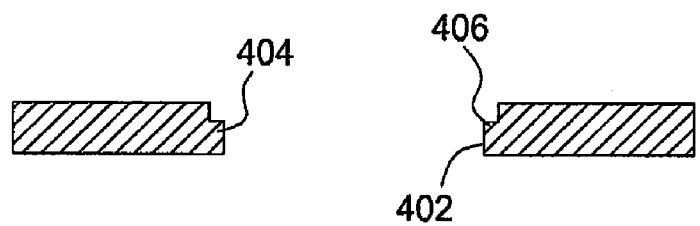

The capture ring 400, shown schematically in the top and cross-sectional views of FIGS. 4A-B, has a C-shape, e.g., resembling an annular ring with a segment removed. It is provided with lip portions 404 and 406, which are used for receiving and supporting a substrate (e.g., photomask or reticle) during transfer to and from the pedestal 224. The capture ring 400 has an inner perimeter 402 that is sized and shaped to substantially match the inner perimeter 302 and the protruding portions 306, 308 of the cover ring 300. The capture ring 400 is designed to be moved between two positions by a lift mechanism 238 (shown in FIG. 2), comprises a plurality of lift pins 230 (one lift pin is shown) that travel through respective guide holes 236. In a first position, the capture ring 400 is lowered beneath the top surface of the pedestal 224, leaving the substrate 222 supported by the pedestal 224 for processing. In this first position, the capture ring 400 essentially couples with the protruding portions 306, 308 of the cover ring 300 to form a complete annular ring such that the top surfaces of the capture ring 400 and the cover ring 300 are substantially in the same horizontal plane. That is, at least certain portions of the capture ring 400 and the cover ring 300 are complementarily shaped. After substrate processing is completed, the capture ring 400 is lifted upwards to its second position, supporting the substrate 222 for transfer out of the chamber 202, and is ready for receiving another substrate for processing.

During processing, the temperature of the substrate 222 is controlled by stabilizing the temperature of the substrate pedestal 224 by flowing a coolant through one or more channels (not shown) provided in the pedestal 224.

In one embodiment, an ion-radical shield 270 is disposed in the chamber 202 above the pedestal 224. The ion-radical shield 270 is electrically isolated from the chamber walls 204 and the pedestal 224, and generally comprises a substantially flat plate 272 supported by a plurality of legs 276 above the pedestal 224. The plate 272 defines one or more openings or apertures 274 that collectively provide a desired open area in the surface of the plate 272 for controlling the amount of ions that pass from a plasma formed in an upper process volume 278 of the process chamber 202 to a lower process volume 280 located between the ion-radical shield 270 and the substrate 222. The plurality of legs 276 are generally located around an outer perimeter of the cover ring 300 and may be fabricated of the same material as the plate 272. The legs 276 may be coupled or secured to the plate 272 and a screen 292 provided underneath the outer perimeter of the cover ring 300 using various methods. At least one of the legs 276, ring 300 or plate 272 may be fabricated using the method 100 described above.

One or more process gases are provided to the process chamber 202 from a gas panel 220 through one or more inlets 216 (e.g., openings, injectors, nozzles, and the like) located above the substrate pedestal 224. In the embodiment depicted in FIG. 2, the process gases are provided to the inlets 216 through an annular gas channel 218 formed in an annular gas injection ring 294 disposed around the chamber lid 208. In one embodiment, the chamber lid 208 is a blank circular lid having a diameter of about 20 inches, and the gas inlet 216 has maximum longitudinal and lateral dimensions each being less than 1 inch, and both are made of solid yttria according to the fabrication method 100 of the present invention. Alternatively, the annular gas injection ring 294 may be provided with the chamber lid 208 as a single component, e.g., an integrated gas injection lid.

Figure 5:
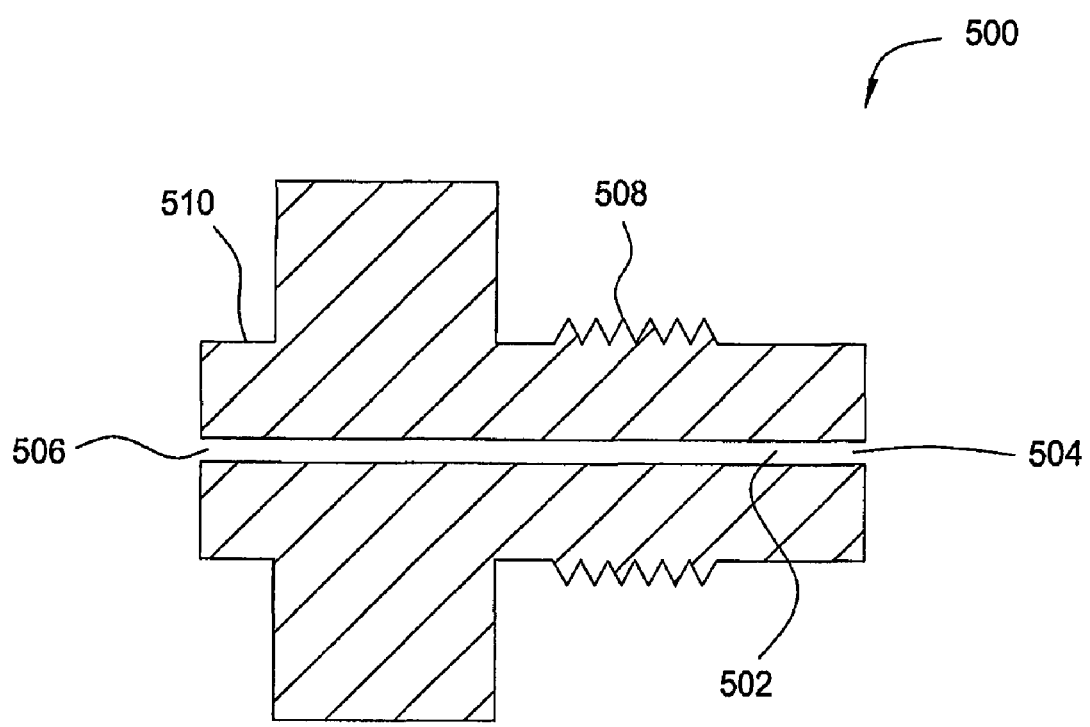
FIG. 5 is a schematic illustration of a cross-sectional view of one embodiment of a gas inlet (nozzle).

FIG. 5 is a schematic cross-sectional view of one embodiment of a gas inlet, shown as a nozzle 500. The nozzle 500 includes a conduit 502 oriented along a longitudinal direction of the nozzle 500. The conduit 502 has a first end 504 coupled to the gas channel 218 and a second end 506 through which process gases exit into the chamber 202. The nozzle 500 may be fabricated using the method 100 described above. The nozzle 500 further has a first cylindrical portion 508 for coupling to the gas injection ring 294, among others. In one embodiment, the cylindrical portion 508 is threaded, and a flat portion 510 is provided near the second end 506 to facilitate the coupling of the cylindrical portion 508 to a corresponding aperture in the gas injection ring 294. Although only certain component parts in this illustrative embodiment of the etch reactor 200 are made of bulk yttria, other component parts such as the legs 276 and gas injection ring 294, among others, which are currently made of either anodized aluminum or aluminum with spray-coated yttria, may also be fabricated as bulk yttria parts according to the method 100. In addition, component parts used in other plasma processing chambers (e.g., gas distribution plate, shower head, chamber liner, shadow ring and so on) may also be fabricated according to the method 100.

During an etch process, power from the plasma source 212 is applied to the antenna 210 to generate a plasma from the process gases. The pressure in the chamber 202 is controlled using a throttle valve 262 and a vacuum pump 264. The temperature of the wall 204 may be controlled using liquid-containing conduits (not shown) that run through the wall 204. Typically, the chamber wall 204 is formed from a metal (e.g., aluminum, stainless steel, among others) and is coupled to an electrical ground 206. The process chamber 202 also comprises conventional systems for process control, internal diagnostic, end point detection, and so on. Such systems are collectively shown as support systems 254.

The controller 246 comprises a central processing unit (CPU) 250, a memory 248, and support circuits 252 for the CPU 250 and facilitates control of the components of the process chamber 202 and, as such, of the etch process, as discussed below in further detail. The controller 246 may be one of any form of general-purpose computer processor that can be used in an industrial setting for controlling various chambers and sub-processors. The memory, or computer-readable medium of the CPU 250 may be one or more of readily available memory such as random access memory (RAM), read only memory (ROM), floppy disk, hard disk, or any other form of digital storage, local or remote. The support circuits 252 are coupled to the CPU 250 for supporting the processor in a conventional manner. These circuits include cache, power supplies, clock circuits, input/output circuitry and subsystems, and the like. The inventive method is generally stored in the memory 248 as a software routine. Alternatively, such software routine may also be stored and/or executed by a second CPU (not shown) that is remotely located from the hardware being controlled by the CPU 250.

In one embodiment, one or more process gases comprising at least one halogen-containing gas, e.g., fluorine-containing or chlorine-containing gas, is introduced into the chamber 202 via gas inlets 216. In general, a fluorine-containing gas, e.g., $CHF_3$, $CF_4$, among others, is used for etching quartz and MoSi layers on the substrate 222, while a chlorine-containing gas such as chlorine ($Cl_2$), is used for etching chromium. A plasma is formed from the process gases by applying RF power to the antenna 210, e.g., at a power level of about 350 W and a frequency of about 13.56 MHz. The ion-neutral shield 270 controls the amount of ions passing through the apertures 274, while allowing predominantly neutral species in the plasma into the lower process volume 280 for etching the substrate 222.

Such an etch process can benefit from the use of yttria parts fabricated according to the method of the present invention because of the improved properties of the parts resulting in reduced maintenance and particle contamination.

While the foregoing is directed to embodiments of the present invention, other and further embodiments of the invention may be devised without departing from the basic scope thereof, and the scope thereof is determined by the claims that follow.

The invention claimed is:

1. A method of fabricating a yttria part, comprising:
    (a) providing a yttria sample;
    (b) sintering the yttria sample;
    (c) machining the sintered yttria sample to form a part; and
    (d) annealing the part to obtain a single-phase microcrystallite structure, wherein the annealing further comprises:
        (d1) exposing the part to an annealing gas in an enclosure;
        (d2) heating the part from a first temperature to a second temperature over a first time period, wherein the heating rate is controlled such that thermal gradient within the part does not exceed about 10 Joules per kilogram per Kelvin (J/kg-K);
        (d3) maintaining the part at the second temperature for a second time period; and
        (d4) cooling the part from the second temperature to the first temperature over a third time period.

2. The method of claim 1, wherein the annealing gas has a gas composition selected from the group consisting of air, an inert gas, forming gas, a reducing gas composition, and an oxidizing gas composition.

3. The method of claim 1, wherein the annealing gas in step (d1) is one of air, nitrogen, argon, and mixtures thereof, and is provided in one of a static or flow condition.

4. The method of claim 1, wherein the second temperature is between about 200 degrees Celsius and about 1000 degrees Celsius.

5. The method of claim 4, wherein the second temperature is between about 800 degrees Celsius and about 1000 degrees Celsius.

6. The method of claim 1, wherein during step (d1), a temperature gradient in a surface region of the part is maintained to be less than about 1 Kelvin per centimeter throughout the first time period.

7. The method of claim 1, wherein during step (d1), an internal thermal gradient is maintained within the part to be less than about 10 Joules per kilogram per Kelvin throughout the first time period.

8. The method of claim 1, wherein during step (d3), a temperature gradient in a surface region of the part is maintained to be less than about 1 Kelvin per centimeter throughout the first time period.

9. The method of claim 1, wherein the yttria sample in step (c) has a purity level of at least about 99.5 percent.

10. The method of claim 1, wherein the part is a component part of a plasma reactor.

11. The method of claim 10, wherein the component part is one of a lid, a ring, an ion shield plate, an ion shield leg, and a nozzle.

* * * * *